US012699013B2

(12) United States Patent
Kolehmainen et al.

(10) Patent No.: US 12,699,013 B2
(45) Date of Patent: Aug. 4, 2026

(54) COATING SYSTEM FOR USE AS THIN FILM SENSOR EXHIBITING ENHANCED SENSITIVITY

(71) Applicant: Oerlikon Surface Solutions AG, Pfäffikon, Pfäffikon (CH)

(72) Inventors: Jukka Kolehmainen, Espoo (FI); Sanna Tervakangas, Espoo (FI); Juha Haikola, Kirkkonummi (FI); Juergen Becker, Geisenheim (DE); Astrid Gies, Flaesch (CH); Christian Scholz, Weiler (DE); Esa Haikola, Kirkkonummi (FI)

(73) Assignee: OERLIKON SURFACE SOLUTIONS AG, PFÄFFIKON, Pfäffikon (CH)

( * ) Notice: Subject to any disclaimer, the term of this patent is extended or adjusted under 35 U.S.C. 154(b) by 282 days.

(21) Appl. No.: 18/292,774

(22) PCT Filed: Jul. 15, 2022

(86) PCT No.: PCT/EP2022/069894
§ 371 (c)(1),
(2) Date: Jan. 26, 2024

(87) PCT Pub. No.: WO2023/006451
PCT Pub. Date: Feb. 2, 2023

(65) Prior Publication Data
US 2025/0085176 A1      Mar. 13, 2025

Related U.S. Application Data

(60) Provisional application No. 63/225,677, filed on Jul. 26, 2021.

(51) Int. Cl.
G01L 1/18              (2006.01)

(52) U.S. Cl.
CPC ..................................... G01L 1/18 (2013.01)

(58) Field of Classification Search
CPC . G01L 1/18; G01L 9/0042; G01L 1/16; G01L 1/2293; G01L 1/2287;
(Continued)

(56) References Cited

U.S. PATENT DOCUMENTS

| | | | |
|---|---|---|---|
| 9,874,965 B2 * | 1/2018 | Pedder | ................... G01L 1/205 |
| 10,941,500 B1 | 3/2021 | Myrick | |

FOREIGN PATENT DOCUMENTS

JP          2004-517483 A      6/2004

OTHER PUBLICATIONS

International Search Report and Written Opinion dated Dec. 20, 2022, in International Application No. PCT/EP2022/069894.
(Continued)

*Primary Examiner* — Brandi N Hopkins
(74) *Attorney, Agent, or Firm* — Procopio, Cory, Hargreaves & Savitch LLP

(57) ABSTRACT

A coating system to be used as thin film sensor includes a piezoresistive sensor element. The piezoresistive sensor element is a layer embedded in the coating system. The coating system is deposited on a surface of a substrate. The piezoresistive sensor element comprises at least one hydrogen free tetrahedral amorphous carbon coating doped with a ta-C:X coating layer, where X is one or more chemical elements selected from the elements groups 13 and 15 of periodic table of elements, wherein the ta-C:X coating layer exhibits an anisotropic gage factor.

19 Claims, 2 Drawing Sheets

(58) Field of Classification Search

Figure 1:
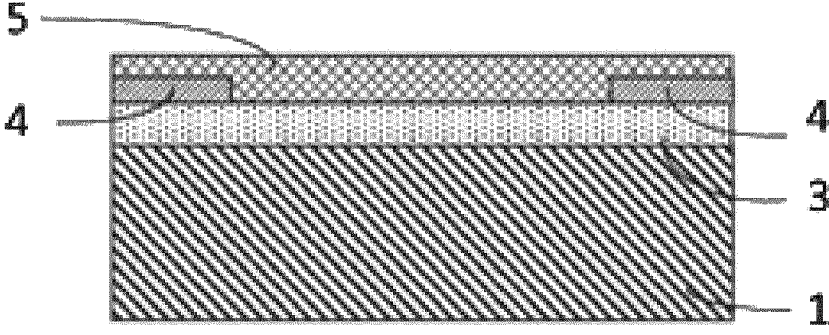

CPC . G01L 9/0055; G01L 1/22; G01L 9/06; G01L 9/08; G01L 5/0019; F16C 19/522; F16C 41/007; C23C 14/0605; C23C 14/025; C23C 14/0688; C23C 14/35; C23C 16/26; C23C 14/14; B81C 1/00158; G01N 27/121; G01N 29/32; G01B 7/18; C09D 5/00; H10D 48/50; H01C 7/02; G01G 19/021; G01K 7/223; G01K 7/226; H01L 21/3247; B81B 7/02

See application file for complete search history.

(56) References Cited

OTHER PUBLICATIONS

Sigitas Tamulevicius et al., "Diamond like carbon nanocomposites with embedded metallic nanoparticles", Reports on Progress in Physics, Institute of Physics Publishing, Bristol, GB, vol. 81, No. 2, Jan. 5, 2018, p. 24501, XP020323758, ISSN: 0034-4885, DOI: 10.1088/1361-6633/AA966F [retrieved on Jan. 5, 2018].

Bewilogua K et al., "Surface technology for automotive engineering", Cirp Annals, Elsevier BV, NL, CH, FR, vol. 58, No. 2, Jan. 1, 2009, pp. 608-627, XP026770029, ISSN: 0007-8506, DOI: 10.1016/J.CIRP.2009.09.001 [retrieved on Oct. 12, 2009].

Meskinis S et al., "Piezoresistive properties and structure of hydrogen-free DLC films deposited by DC and pulsed-DC unbalanced magnetron sputtering", Surface and Coatings Technology, vol. 211, Oct. 10, 2011, pp. 172-175, XP028957274, ISSN: 0257-8972, DOI: 10.1016/J.SURFCOAT.2011.10.004.

Ma, Xin et al., "Piezoresistive behavior of amorphous carbon films for high-performance MEMS force sensors," Applied Physics Letters 114, 253502, Jun. 24, 2019.

* cited by examiner

COATING SYSTEM FOR USE AS THIN FILM SENSOR EXHIBITING ENHANCED SENSITIVITY

CROSS-REFERENCE TO RELATED APPLICATION

This patent application is a national phase entry of international patent application No. PCT/EP2022/069894 filed on Jul. 15, 2022, which claims the benefit of U.S. provisional patent application No. 63/225,677 filed on Jul. 26, 2021, the entire disclosures of which are expressly incorporated herein by reference.

The present invention relates to a thin film sensor construed as a coating system comprising a piezoresistive material sensor layer based on hydrogen free tetrahedral amorphous carbon material doped with a chemical element X, i.e. a ta-C:X layer, where X is one or more chemical elements selected from the elements groups 13 and 15 of the periodic table of elements, in particular selected from boron (B), aluminum (AI), gallium (Ga), indium (In), thallium (TI), nitrogen (N) and phosphorus (P), for enhancing sensor properties, in particular for enhancing sensor sensitivity. Likewise, the present invention relates to components or part of components comprising a thin film sensor according to the present invention, where the material of the substrate surface of the component or of the part of the component on which the thin film sensor is applied comprises preferably polymers, ceramics and/or composite materials.

TECHNICAL FIELD

Sensors have been used for several decades in many applications which nowadays have a very strong presence in the semi-conductor segment. Their demand is increasingly drastically due to the emergence of new technologies, such as the internet of things (IoT), the need and possibility to process big data to understand and predict the behavior of complex systems, the introduction of industry 4.0 standards and for monitoring fully automated devices including mechanical and electronic components.

A sensor is the interface between the real analog world and the digital world, which allows to convert all measurable quantities such as light intensity, temperature, forces, accelerations, movements, magnetic fields, etc. into electrical signals which can be processed and analyzed afterwards digitally.

In the context of the present description a thin film is a layer of material ranging from fractions of a nanometer to several micrometers in thickness, where any suitable technique for the deposition of a thin film can be applied, and a thin film deposition is the act of applying a thin film to a surface of a substrate or to a surface of previously deposited layers.

The term embedded sensors is normally used for referring to following two types of sensors:

1. Sensor elements integrated into semiconductor chips or included in integrated circuits (IC) and placed into electronic devices to measure different states of a larger device or machine, it means for example for determining the position of a car, or the acceleration of a robot arm, or the cooling temperature of a heated system, etc.
2. Sensors that are directly implemented, it means applied directly onto a surface of a component or embedded into a component that needs to be monitored in relation to its properties and/or external effects on the component itself.

It is known that several sensors of the same type or of different types can be embedded in different positions of a component in order to monitor one or more measurable properties of said component.

The term component in the context of the present description includes also any part of a component or of an article or tool.

In particular, in the context of the present description a component can be (but is not limited to) a tool, a mechanical element, a heating part, an automotive part (e.g. a piston, a bearing, a shaft, an axle, a valve, a battery, a part of an aircraft or an aircraft (e.g. a turbine engine component, a landing gear, a housing, or a part of an industrial machine).

Typical properties monitored by sensors in such applications are for example strain, forces, pressure, vibrations and temperature (e.g. temperature at a surface of the said component).

For the sake of simplification, at least some parts of the present description will be focused to strain gauge sensors and temperature sensors. However, this focus should not be understood as a limitation of the present invention.

Some known sensors that can be embedded into a component comprise metal or semiconductor foil strain gauges, as well as resistance temperature detectors (RTD) such as platinum based PT100 sensors, or negative temperature coefficient thermistor (NTC). Such kind of sensors, due to their smaller geometry, can be easily attached to components that need to be monitored (i.e. from which some properties need to be measured). Further, also bulky sensors such as magneto-resistive torque sensors and classical pressure sensors are known, which can be consider for use as embedded sensors.

However the use of the above mentioned well known sensors, involves some limitations, for example metal foil strain gauges involve limitations in particular due to their high ratio of length to cross-section and their nature and shape, which makes difficult to embed them into components having complex geometries.

Furthermore, the sensitivity of such known sensors is intrinsically quite low. Consequently, their setup become more complex in cases in which high sensitivity for more precise measurements is required.

One additional disadvantage of the above mentioned known sensors is that they are also more prone to damage after long operation time.

Semiconductor film strain gauges have also their flaws as they are fragile, expensive to manufacture and their integration into metallic components is more difficult because of their high temperature processing.

Platinum-based sensors are complex to set up especially when precise measurements are required. As for the metal foils strain gauge, the ratio of length to cross-section is high which makes it difficult to integrate into complex surfaces. They are also quite sensitive to chemically harsh environment and mechanical stresses which requires additional shielding. These sensors are already bulky with respect to the size of the component to measure, the additional shielding increases their mass considerably which results to a unfavorable decrease of their response time.

Thermistor, as well as magneto-resistive torque sensors are bulky and have slow response time, they need special materials of components to be used as part of a machine as elementary sensor and are expensive to process.

Pressure sensors are limited in the measured pressure range and temperature range, they have insufficient long-term stability of the measurement and are limited by the media resistance, and furthermore, the measurements are strong dependent of the temperature of the sensor.

In the last years, the so called thin film sensors have been developed, which comprise at least one coating layer for accomplishing the sensor function, and which can be used as sensors for measuring desired properties at any surface of a component. Such coating layers can be deposited at a surface in an easy manner instead of requiring a complex implementation of wires or foils for attaining the sensor function. Such recently developed thin film sensors are currently considered a well-established technology and also a part of a coating solution family called "smart coatings".

Conventional thin film deposition methods (also referred to as coating techniques) can be used for producing such thin film sensors, so that the thin film can be deposited on a substrate surface to be used as sensor element.

Some of such thin film deposition methods are for example physical vapor deposition (PVD), chemical vapor deposition (CVD), plasma assisted chemical vapor deposition (PA-CVD), thermal spraying, etc.

The above mentioned coating techniques are in particular suitable for the deposition of thin films sensors on components or part of components having complex geometries.

In the context of the present description the thin film sensors are also called thin coating film sensors or simply coating sensors.

Strain gauges comprising thin film sensors have demonstrated to be very accurate with respect to torque and force measurements, have long-term stability and can provide continuous measurement of the force and torque during operation. In this known strain gauges the thin film sensors are usually metal coatings, in particular coatings formed of Cr- or Ni-based metals, which are deposited on an insulating layer if the substrate of the component on which the thin film sensor should be deposited is made of a metal material. In such cases the materials used for the formation of the insulating layer are for example, $Al_2O_3$, CrO, AlCrO or amorphous carbon-based coatings. Additionally, the metal coating can optionally be covered by a further insulating layer.

However, even if thin film sensors contribute to a major improvement and precision of the measurements compared to the more conventional embedded sensors, they still have the disadvantage that they lack of the necessary sensitivity for attaining more accurate measurements and also have the further disadvantage that their response time for transient measurements is not fast enough.

Objective of the Present Invention

The main objective of the present invention is to provide a thin film sensor that overcomes the disadvantages of the state of the art. In particular the thin film sensor according to the present invention should make possible to attain a higher sensitivity for allowing more accurate measurements and preferably should also allow a faster response time for transient measurements.

Description of the Present Invention

The objective of the present invention is attained by providing a coating system according to claim 1. Preferred embodiments of the present invention or preferred aspects of the present invention are described in the subclaims 2 to 15.

A coating system according to the present invention is a coating system to be used as thin film sensor, comprising a piezoresistive sensor element, wherein the piezoresistive sensor element is a layer embedded in the coating system, wherein the coating system is deposited on a surface of a substrate, preferably the substrate being a component or a tool or a part of a component or a part of a tool, wherein the piezoresistive sensor element comprises at least one hydrogen free tetrahedral amorphous carbon coating layer doped with X, i.e. a ta-C:X coating layer, where X is one or more chemical elements selected from the elements groups 13 and 15 of the periodic table of elements, preferably X is one or more from B, Al, Ga, In, TI, N and P, wherein the ta-C:X coating layer exhibits an anisotropic gage factor.

An anisotropic gage factor of the ta-C:X coating layer should be understood as the ta-C:X coating layer exhibiting an anisotropy in the resistance response for strain, such that the magnitude of the response in the change of resistance to strain differs when comparing measurements where the strain is applied on different orthogonal axes of the piezoresistive sensor element, e.g. in the longitudinal direction and in the vertical direction.

In other words, when the strain is applied longitudinally, along the sensor element length, or normal to the surface on the sensor element, different gage factors are obtained, where the difference is of at least ten times. Preferably the gage factor in the vertical direction is at least 10 times higher than the gage factor in the longitudinal direction.

For example in a thin film sensor having a structure constructed as described in FIG. 1. The thin film sensor can be subjected to strain by stretching or by squeezing the substrate, e.g. a) along the surface, that is along length or width of the sensor element, or b) normal to the surface, that is across the sensor element thickness. If the component 1 were a beam with a rectangular cross-section this can easily be strained lengthwise by bending the beam and strained in normal direction by squeezing between two flat surfaces.

In one example in which a ta-C:N coating layer were used as ta-C:X layer, having elastic modulus and hardness as measured by using nanoindentation techniques of roughly 380 GPa and 36 GPa, by applying the method explained above, in the case a) the response of the lengthwise strain was of 100 microstrains (relative dimensional change of $10^{-4}$), which has been measured on a sample as 0,045-0,055% change in resistance; while in the case b) the response of the normal strain of 2 microstrains was within range of 0,03-0,09%. As sensitivity this corresponds to a gage factor in a range of 4,5 to 5,5 in the longitudinal direction (case a)) and to a gage factor in a range of 150 to 450 in the normal direction (also called vertical direction in the present context—corresponding to the measure in case b)).

Preferably the inventive ta-C:X coating layer according to the present invention is designed having an anisotropic gage factor corresponding to a longitudinal gage factor in a range from 4 to 20, and a vertical gage factor (vertical gage factor to be understood as gage factor in the normal direction as explained above) in a range from 100 to 450, e.g. a longitudinal gage factor in a range between 4 and 6 and a vertical gage factor in a range between 295 and 305.

The at least one ta-C:X coating layer preferably exhibits:
a hardness HIT determined by nanoindentation techniques of at least 29 GPa, preferably in a range from 30 GPa and 45 GPa,
an elastic modulus EIT determined by nanoindentation techniques of at least 300 GPa, preferably in a range from 330 GPa and 430 GPa,
a carbon content determined by SIMS analysis of at least 90 at. %, preferably in a range from 91 at. % and 98 at. %, and a content of X determined by SIMS analysis of at least 2 at. %, preferably in a range from 2 at. % to 20 at. %. Particularly good results were attained when X comprises:

nitrogen (N), or phosphor (P), or nitrogen (N) and phosphor (P).

According to a particularly preferred embodiment of the present invention, in which X comprises nitrogen (N), the N content in the at least one ta-C:X coating layer is in a range from 2 at. % to 10 at. %, preferably in a range from 6.5 at % to 8.5 at. %.

According to a preferred variant of the above mentioned particularly preferred embodiment of an inventive coating system, X is nitrogen, so that ta-C-X is ta-C:N.

When X=N, it was observed for example a particularly advantageously defined anisotropic gage factor when the N content in the ta-C:N coating layer was in is a range from 6.5 at. % to 7.5 at. %.

According to a preferred embodiment of the present invention the piezoresistive sensor element is contacted by electrically conductive connectors in such a manner that the piezoresistive sensor element provides an electrical signal as a function of the strain and/or temperature from the substrate surface.

When the substrate is electrically conductive, the coating system is designed comprising an under electrical insulating layer provided between the substrate surface and the piezoresistive sensor element. The under electrical insulating layer can be for example an $Al_2O_3$layer deposited by using thermal spray techniques.

Depending on the kind of substrate and use, the coating system can be designed comprising also an adhesive layer provided directly onto the substrate surface, preferably for ensuring adhesion of the coating system to the substrate surface.

Depending on the kind of use the inventive coating system can be designed comprising an upper electrical insulating layer provided directly onto the piezoresistive sensor element.

Depending on the kind of use, it would be also beneficial to design the coating system comprising at least one functional layer.

The functional layer can be preferably a ta-C layer or any DLC coating (hydrogen free or hydrogen-containing DLC layer), or any other coating layers exhibiting specific tribological properties depending of the use.

A DLC layer is a so-called Diamond Like Coating layer, also called amorphous carbon layers that can be:

hydrogen free and undoped, such a-C and ta-C, or hydrogen free and doped, e.g. if the doping element is a metal and the metal is abbreviated Me, then a-C: Me or ta-C:Me hydrogenated and undoped, such as a-C:H, or hydrogenated and doped, e.g. if the doping element is a metal and the metal is abbreviated Me, then a-C:H:Me.

A thin film sensor comprising a coating system according to the present invention is particularly useful for determining temperature and/or strain.

A thin film sensor according to the present invention is especially useful to be incorporated in automotive components for determining temperature and/or strain.

The present invention relates thus also to components, preferably automotive components, but also relates to tools comprising a thin film sensor according to the present invention incorporated in the component or the tool for determining temperature and/or strain. Thin film sensors according to the present invention are preferably producing by using a method, which comprises an step, in which the at least one ta-C:X coating layer is deposited by using PVD or PA-CVD techniques.

A preferred method for producing a coating system or respectively for producing a thin film sensor (i.e. also a thin film incorporated in a component or tool as mentioned above) according to the present invention, comprises an step in which the at least one ta-C:X coating layer is deposited by using PVD or PA-CVD techniques.

The thin film sensors according to the present invention can be applied to any kind of substrates, however such thin film sensors are particularly suitable to be applied to components or to part of components as embedded sensors, where preferably the material of the substrate surface of the component or of the part of the component on which the thin film sensor is applied, comprises preferably polymers, ceramics and/or composite materials.

Surprisingly, by studying electrical effects of nitrogen doped hydrogen free tetrahedral amorphous carbon coatings in a normally used photovoltaic experiment, the inventors detected that slight movements produced in the same room (for example vibrations caused by someone walking in the room), where the photovoltaic sample was located, induced a quite noticeable and measurable change of the resistivity of the photovoltaic sample (the change in the resistivity of the film was measured as a difference in the resistance caused between visible and UV light.

The inventors had the idea to implement the features observed in the studied ta-C:N coatings in thin film sensors to be used as embedded sensors, wherein the implementation involved the use of a doped tetrahedral amorphous carbon (doped ta-C) layer as piezoresistive material layer, preferably a nitrogen-doped tetrahedral amorphous carbon (ta-C:N) coating layer, or a phosphor-doped tetrahedral amorphous carbon (ta-C:P) coating layer, or a nitrogen- and phosphor-doped tetrahedral amorphous carbon (ta-C:N:P) coating layer, in place of the commonly used metallic layers.

The inventive thin film sensors created in this manner are able to respond to fast strain changes (fast strain changes should be understood as vibrations of several tens of kHz, e.g. higher than 40 kHz) and are highly sensitive accurate temperature sensors (high sensitivity of sensors in this context should be understood as values of beta factor over 900 in a use as a NTC thermistor).

Moreover, the deposition of the thin film sensors can be combined with a laser structuring or patterning of the surface in order to produce an electrical path on the surface for getting an optimized resistivity adjusted depending on the requirements of the application.

Considering that nowadays many components are produced including surfaces coated with coating systems comprising functional coating layers for producing desired properties at their surfaces (for example functional coating layers for attaining thermal barrier properties, corrosion resistance properties, wear resistance properties, friction reduction, etc.), the inventors consider clearly advantageous to integrate a thin film sensor and a such functional coating layer in a same coating system.

According to a preferred embodiment of a thin film sensor according to the present invention at least one embedded piezoresistive material sensor layer (hereafter also called embedded piezoresistive sensor element) is provided in a coating system which is applied on a surface of a component or a tool, wherein the at least one embedded piezoresistive sensor element comprises ta-C:X coating layer. Preferably the at least one embedded piezoresistive sensor element comprises a nitrogen-doped tetrahedral amorphous carbon coating layer (ta-C:N).

As mentioned above, the embedded piezoresistive sensor element can comprises or consists of a layer of a X-doped tetrahedral amorphous carbon (ta-C:X), where X is one or more chemical elements selected from the elements groups 13 and 15 of the periodic table of elements, in particular selected from B, Al, Ga, In, TI, N and P, for enhancing sensor properties, in particular for enhancing sensor sensitivity.

For the use of the thin film sensors according to the present invention, the inventors developed a method, which allows to measure at least temperature, strain, pressure and/or vibration taking effect on the component surface, on which the thin film sensor is applied.

According to a preferred embodiment of the present invention, the at least one embedded piezoresistive sensor element is provided being a layer comprised in a coating system, wherein a functional layer, in particular a layer exhibiting desired tribological properties (also called a tribological layer) is also comprised in the coating system but preferably as outermost layer of the coating system (produced on top of the coating system).

DETAILED DESCRIPTION OF THE PRESENT INVENTION

In order to facilitate the understanding of the present invention, some examples of the present invention will be described below in more detail. However, the examples and Figures used below should not be understood as a limitation of the present invention but only as showcases or preferred embodiments of the present invention.

Figures used:

FIG. 1: Structure of a preferred coating system according to the present invention comprising a piezoresistive sensor element 5 comprised in the coating system, where the coating system is applied on a surface of a component.

Figure 2:
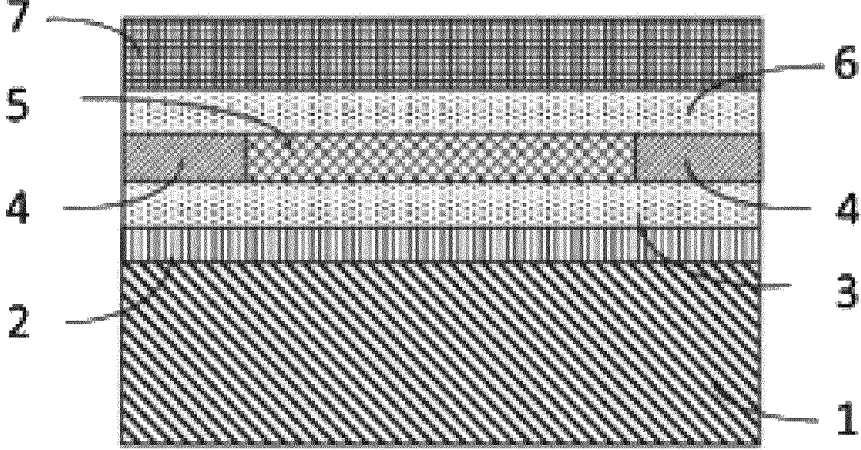

FIG. 2: Structure of a further preferred coating system according to the present invention comprising a piezoresistive sensor element 5 embedded into the coating system, where the coating system is applied on a surface of a component.

Figure 3:
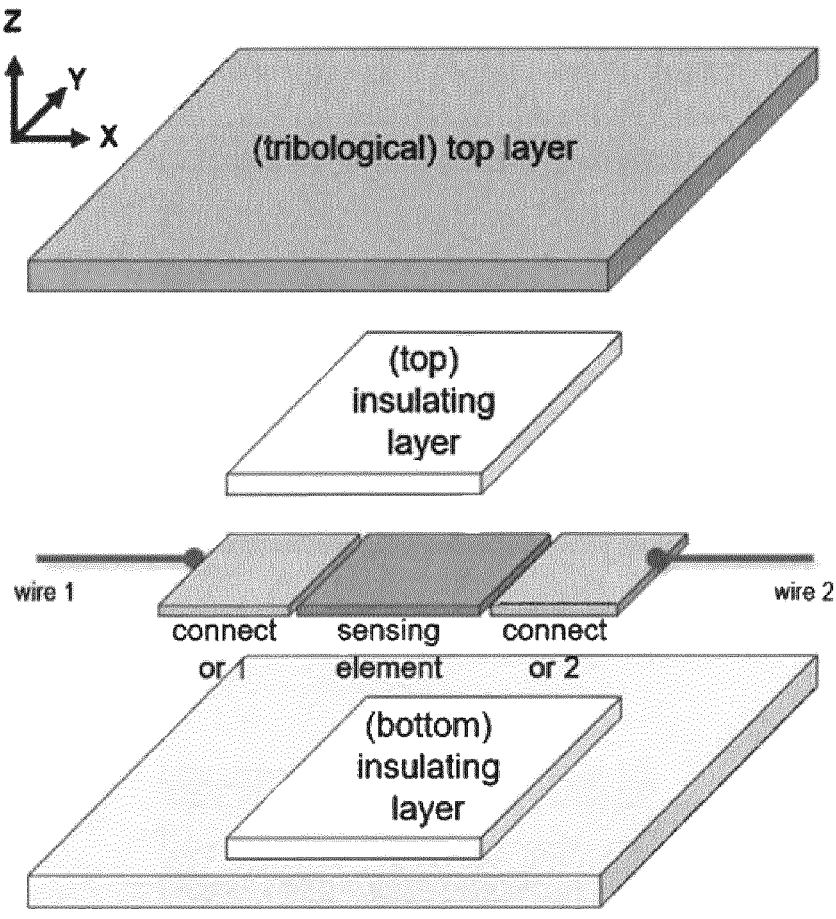

FIG. 3: Schematic overview of the disposition of the different layers comprised in the coating system structure shown in FIG. 2.

A preferred embodiment of a coating system structure (also called coating system architecture), in which a piezoresistive sensor element is embedded according to the present invention is illustrated in FIG. 1.

A further preferred embodiment of a coating system structure (also called coating system architecture), in which a piezoresistive sensor element is embedded according to the present invention an in which a function layer 7 is deposited as functional layer is illustrated in FIG. 2.

FIG. 3 shows a schematic overview of the disposition of the different layers comprised in the coating system structure shown in FIG. 2. This structure allows the measurement of torque, strain, force, pressure or vibration taking effect on a component 1 and/or the measurement of its temperature. In this coating system structure a piezoresistive sensor element 5 is provided on a surface of the component 1 as a thin film (also referred to as a thin coating layer or a thin film layer or simply a coating layer). The coating system can be deposited either partially or completely covering the component 1. The piezoresistive sensor element 5 comprises a tetrahedral amorphous carbon layer doped with at least one chemical element, in particular a nitrogen doped tetrahedral amorphous carbon (ta-C:N), whose nitrogen-doping concentrations preferably range from 0.1 at. % to 10 at. %. With this choice of material, the gauge factor, i.e. sensitivity of the strain measurement is much higher than the conventional sensors (state of the art metal thin films used as thin film sensors has a gauge factor between 2 and 4) and is anisotropic, hence it reacts more accurately to slight modifications of the resistivity of the sensor coming from small deformations of the component. The layer thickness of the piezoresistive sensor element is preferably a value in a range from 0.1 µm to 5 µm, more preferably in a range from 0.2 µm to 2 µm.

This kind of thin film sensor according to the present invention allows a better coverage of the component compared to bulkier sensors (e.g. Pt100 in temperature measurement and MEMS sensors in pressure measurements), even if the component has a complex geometry.

When the component is made of a metallic material or at least the substrate of the component to be monitored (measured) is made of a metallic material, an additional insulation layer 3 with high electrical resistivity (high electrical resistivity in this context should be understood as values of electrical resistivity equal or higher than $10^9$ ohm*m) needs to be provided between the piezoresistive sensor element 5 and the component 1, wherein the insulation layer is preferably a metal oxide layer, in particular a $Al_2O_3$ layer, CrO layer, AlCrO layer or an amorphous carbon-based coating, wherein the amorphous carbon-based coating layer has a different chemical element composition than the nitrogen-doped tetrahedral amorphous carbon layer (ta-C:N) deposited as piezoresistive sensor element 5.

The layer thickness of the insulation layer 3 is preferably in a range from 0.1 µm to 5 µm, more preferably in a range from 0.2 µm to 2 µm.

The insulation layer 3 can eventually be an amorphous carbon layer comprising one or more dopant elements. However, if the dopant element is nitrogen, the concentration of nitrogen in the insulation layer 3 is lower than it in the piezoresistive sensor element 5. The concentration of the one or more dopant elements in the doped amorphous carbon layer can vary, for example describing a gradient, it means that the one or more dopant elements, for example nitrogen can be present in the insulation layer 3 as dopant element in such a manner that the nitrogen concentration increases in the direction from the component to the piezoresistive sensor element 5, varying for example from zero to the concentration of nitrogen in the piezoresistive sensor element 5.

An optional adhesion layer 2 can be deposited directly on the component 1 in order to improve the adhesion between the component 1 and the insulating layer 3, or if not any insulating layer 3 required (for example when the substrate is not metallic), an optional adhesion layer 2 can be deposited between the component 1 and the piezoresistive sensor element. The adhesion layer 3 preferably comprises metals and/or nitrides, in particular can comprise chromium (Cr) or chromium nitride, or titanium (Ti) or a combination thereof, wherein the layer thickness is preferably in a range from 0.1 µm to 1 µm, more preferably in a range from 0.1 µm to 0.5 µm.

Additionally, one or more electrically conductive connectors 4 are provided, contacting the piezoresistive sensor element 5 in order to conduct the electrical signals from the sensor element to an electronic device collecting and converting the electrical signals into digital signals to be processed either in real time, saved into memory for later analysis or transmitted by wireless means.

Optionally an upper insulating layer 6 can be deposited above at least a part of the piezoresistive sensor element 5 and/or above a part of the electrical connectors 4, wherein the composition of the upper insulating layer 6 is a metal oxide, in particular $Al_2O_3$, CrO, AlCrO or an amorphous carbon-based coating having a high electrical resistivity (e.g. in a magnitude equal or higher than $10^9$ ohm*m). The thickness of the upper optional insulating layer 6 is preferably from 1 μm and 30 μm, more preferably in a range from 2 μm to 10 μm.

The coating system for forming a thin film sensor according to the present invention can comprise additionally (but only optionally) a functional layer 7 deposited as top layer (outermost layer of the coating system) in order to improve surface properties of the component, for example for improving corrosion resistance, wear resistance, friction properties, and/or any other tribological properties of the component, or also to reduce thermal conductivity by acting for example as a thermal barrier coating layer.

The substrate material comprising the surface to be coated of the component can comprise for example metals, metal oxides, carbides, flexible materials, in particular, steel, stainless steel, aluminum, copper, Ni-based superalloys, $Al_2O_3$, $ZrO_2$, SiC, ceramic matrix composites (CMC), polymers, etc. The component can be flat, cylindrical or have a complex geometry, wherein the thin film sensor comprising the piezoresistive sensor element according to the present invention covers either partially or completely the surface of the component.

According to another preferred embodiment of the present invention and illustrated by FIG. 1, a piezoresistive sensor element 5 is provided on a component 1, covering at least partially or completely the component 1. The piezoresistive sensor comprises a doped ta-C material, in particular a nitrogen doped tetrahedral amorphous carbon (ta-C) having a high hardness (high hardness in this context should be understood as HIT hardness equal or higher than 30 GPa, preferably equal or higher than 35 GPa measured by using nanoindentation techniques, for example by using a Fisherscope device). The layer thickness of the piezoresistive sensor element is preferably in a range from 0.1 μm to 5 μm, more preferably from 0.2 μm to 2 μm.

In case that the component comprise a metallic material as surface on which the thin film sensor should be applied, then an additional insulation layer 3 with high electrical resistivity (e.g. in a magnitude equal or higher than $10^9$ ohm*m) is provided between the piezoresistive sensor element 5 and the component 1, wherein the insulation layer 3 is preferably a metal oxide layer, in particular a layer comprising or consisting of $Al_2O_3$, CrO, AlCrO or an amorphous carbon-based coating which is not doped or comprises a gradient with respect to the concentration of dopant, i.e. nitrogen, increasing the nitrogen concentration from the substrate to the piezoresistive sensor element from zero to the value of nitrogen concentration of the piezoresistive sensor element 5. The layer thickness of the insulation layer is preferably in a range from 0.1 μm to 5 μm, more preferably from 0.2 μm to 2 μm. One or more electrically conductive connectors 4 are provided to the piezoresistive sensor element 5 in order to conduct the electrical signals from the sensor to an electronic device collecting and converting the electrical signals into digital signals to be processed either in real time, saved into memory for later analysis or transmitted by wireless means. The piezoresistive sensor element is deposited in such a way that it covers partially or completely the conductive connectors 4.

According to another embodiment (e.g. as shown in FIG. 1), the piezoresistive sensor element 5 is produced in such a way that it also functions as tribological function layer and is therefore placed on top of the coating system deposited on the component 1, wherein the composition of the piezoresistive sensor element comprises a doped ta-C material, in particular a nitrogen-doped tetrahedral amorphous carbon (ta-C:N) and have a high hardness (high hardness in this context should be understood as HIT hardness equal or higher than 30 GPa, preferably equal or higher than 35 GPa measured by using nanoindentation techniques, for example by using a Fisherscope device).

According to an additional embodiment, the coating system comprising the piezoresistive sensor element 5 is repeated at least two times and provided for each component forming a stacked structure, such as stacked battery elements, as well as over 36 GPa in hardness measured with nanoindentation the housing of the stacked components or housing of battery, in order to measure pressure differences on the battery element and/or changes of temperatures on the casing during the operation. The pressure measurements of individual battery elements or the monitoring of the temperature of the batteries and/or housing allows early safety action in order to prevent damage of the battery element as well as the device or when batteries are implemented in electrical vehicles.

According to a further embodiment, the coating system comprising the piezoresistive sensor element 5, in particular the piezoresistive sensor element can be structured for example into specific patterns in order to adjust the resistivity of the sensor material by using laser patterning method.

Overall, the provided coatings according to the present invention can be produced by high power impulse magnetron sputtering processes, also called HIPIMS processes, high frequency sputter process, DC magnetron sputtering, cathodic arc discharge, plasma assisted chemical vapor deposition (PA-CVD) or reactive physical vapor deposition (PVD).

A short description of the two main sensing features (strain and temperature) of the present invention is presented in the next paragraph.

With respect to the strain measurement, the strain is sensed as a change in the ohmic resistance of the sensor element. The gauge factor determines the sensitivity of the strain gauge sensor element according to the following formula:

$$GF = \Delta R / Ro / \varepsilon$$

where
GF: gauge factor
DR: different of resistance in strain gauge
Ro: unstrained resistance of the strain gauge
$\varepsilon = \Delta L / L$ is the strain in which $\Delta L$ is the absolute difference in length and L is the original length without strain.

The measurement of the temperature is done through the change in the ohmic resistance of the sensor element according to the formula:

$$R = Ro \cdot \exp\left[\left(\beta(1/(T-1))/To\right)\right]$$

where

Ro: unstrained resistance of the strain gauge

ε=ΔL/L is the strain in which ΔL is the absolute difference in length and L is the original length without strain.

With the present invention, the piezoresistive tetrahedral amorphous carbon material, in particular when it is doped with nitrogen, provides a much higher gauge factor than conventional sensors (e.g. by a factor up to 10). The relatively high resistivity of the sensor (e.g. a sensor resistance varying from 10 kohm up to 500 kohm) enables simple measurement setup with low power consumption (e.g. on level of 60 µW in power consumption). Unlike other embedded thin film sensors using different materials as sensor layers, the response time is extremely fast (e.g. a response time of less than 6 ms in temperature measurement), allowing accurate measurements for transient effects (e.g. detecting camera flash light). The ta-C materials, in particular a doped tetrahedral amorphous carbon coating (doped ta-C) provides a high sensitivity for temperature measurements (e.g. corresponding to a thermistor beta value over 900) which are comparable with the ones obtained by negative temperature coefficient (NTC) thermistors but having the advantage of easy embedding into a coating system and in this manner easy application to components or parts of components (typically NTC thermistors beta values are between 3000 to 5000). Unlike the metal-based sensors known from the state of the art (e.g. thin film sensors having a metal layer as piezoresistive material sensor layer), the sensors provided by the present invention, are more robust, chemically inert and can be applied for long life applications. The materials used in the coating systems according to the present invention are also biocompatible allowing to broaden the use of such sensors for medical applications, such as medical instruments, embedded sensors for implants. Additionally the materials used in the present invention have high elastic modulus and high wear resistance. Furthermore, components made of materials with high rigidity such as can be provided with thin film sensors according to the present invention as well as flexible materials, such as polyamide.

Hydrogen free in the context of the present invention corresponds to a hydrogen content in a range from 0 at. % to 1,5 at. %, when the hydrogen content is determined by using techniques of the type SIMS Analysis. Preferably the hydrogen content determined in this manner is in a range from 0 at. % to 1.4 at. %. Hence the hydrogen content determined by using SIMS Analysis in a hydrogen free tetrahedral amorphous carbon coating doped with X (ta-C: X) according to the present invention can be measured to be maximal 1.5 at. %, preferably maximal 1.4 at %.

In the context of the present description hydrogen free tetrahedral amorphous carbon coating layers are also simply called tetrahedral amorphous carbon coating layers.

The invention claimed is:

1. A coating system to be used as thin film sensor, the coating system comprising:

a piezoresistive sensor element, wherein the piezoresistive sensor element is a layer embedded in the coating system, wherein the coating system is deposited on a surface of a substrate, wherein the piezoresistive sensor element comprises at least one hydrogen free tetrahedral amorphous carbon coating doped with a ta-C:X coating layer, where X is one or more chemical elements selected from the elements groups 13 and 15 of periodic table of elements, wherein the ta-C:X coating layer exhibits an anisotropic gage factor, and wherein the ta-C:X coating layer has an anisotropic gage factor comprising a vertical gage factor and a longitudinal factor, where the vertical factor is at least ten times higher than the longitudinal gage factor.

2. The coating system according to claim 1, wherein the at least one ta-C:X coating layer exhibits:

a hardness HIT determined by nanoindentation techniques of at least 29 GPa, an elastic modulus EIT determined by nanoindentation techniques of at least 300 GPa, a carbon content determined by SIMS analysis of at least 90 at, and a content of X determined by SIMS analysis of at least 2 at.

3. The coating system according to claim 2, wherein the at least one ta-C:X coating layer exhibits:

a hardness HIT determined by nanoindentation techniques in a range from 30 GPa and 45 GPa, an elastic modulus EIT determined by nanoindentation techniques in a range from 330 GPa and 430 GPa, a carbon content determined by SIMS analysis in a range from 91 at. % and 98 at. %, and a content of X determined by SIMS analysis in a range from 2 at. % to 20 at. %.

4. The coating system according to claim 1, wherein X comprises:

nitrogen N, or phosphor P, or nitrogen N and phosphor P.

5. The coating system according to claim 4, wherein a nitrogen content in the of at least one ta-C:X coating layer is in a range from 2 at. % to 10 at.

6. The coating system according to claim 5, wherein the nitrogen content in the of at least one ta-C:X coating layer is in a range from 6.5 at % to 8.5 at. %.

7. The coating system according to claim 4, wherein ta-C-X is ta-C:N.

8. The coating system according to claim 4, wherein a N content in the ta-C:N coating layer in is a range from 6.5 at. % to 7.5 at. %.

9. The coating system according to claim 1, wherein the piezoresistive sensor element is contacted by electrically conductive connectors in such a manner that the piezoresistive sensor element provides an electrical signal as a function of at least a strain or temperature from the substrate surface.

10. The coating system according to claim 1, wherein the coating system comprises an under electrical insulating layer provided between the substrate surface and the piezoresistive sensor element.

11. The coating system according to claim 1, wherein the coating system comprises an adhesive layer provided directly onto the substrate surface.

12. The coating system according to claim 1, wherein the coating system comprises an upper electrical insulating layer provided directly onto the piezoresistive sensor element.

13. The coating system according to claim 1, wherein the coating system comprises at least one functional layer.

14. A thin film sensor comprising a coating system according to claim 1 to be used for determining at least temperature or strain.

15. A component, or a tool comprising a thin film sensor according to claim 14, said thin film sensor incorporated in the component or tool for determining at least temperature or strain.

16. A method for producing a coating system according to claim 1, or for producing a thin film sensor according to claim 14, wherein the at least one ta-C:X coating layer is deposited by using PVD or PA-CVD techniques.

17. The coating system according to claim 1, wherein X is one or more from B, Al, Ga, In, TI, N and P.

18. The coating system according to claim 1, wherein the longitudinal gage factor in a range from 4 to 20, and the vertical gage factor in a range from 100 to 450.

19. The coating system according to claim 1, wherein at least one functional layer is a DLC coating layer, or any other coating layer exhibiting specific tribological properties depending of the use.

* * * * *